Figure 1:
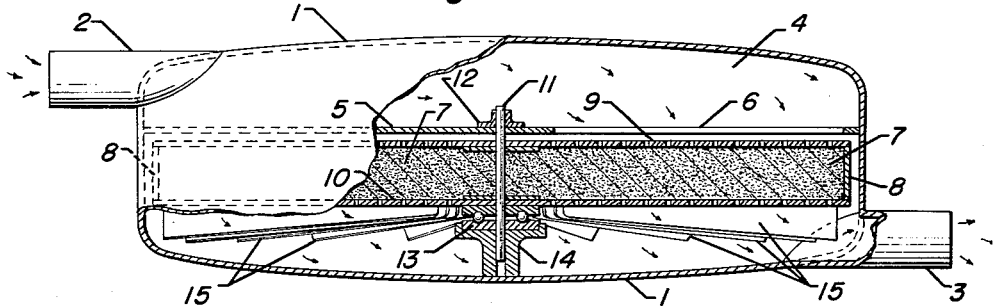

Aug. 21, 1962 H. S. BLOCH 3,050,375
MOVING BED CATALYTIC CONVERTER
Filed July 22, 1960 2 Sheets-Sheet 1

INVENTOR:
Herman S. Bloch
BY: Chester J. Giuliani
Philip T. Liggett
ATTORNEYS

Aug. 21, 1962  H. S. BLOCH  3,050,375
MOVING BED CATALYTIC CONVERTER
Filed July 22, 1960  2 Sheets-Sheet 2

INVENTOR:
Herman S. Bloch
BY:
Chester J. Giuliani
Philip T. Liggett
ATTORNEYS.

3,050,375
MOVING BED CATALYTIC CONVERTER
Herman S. Bloch, Skokie, Ill., assignor to Universal Oil Products Company, Des Plaines, Ill., a corporation of Delaware
Filed July 22, 1960, Ser. No. 44,651
9 Claims. (Cl. 23—288)

This invention relates to an improved catalytic converter design which exposes only a portion of the catalyst content to the gas stream at any one time and thereby provides a longer high activity life for a given quantity of catalyst.

The present improved form of converter is particularly adapted for use in effecting the treatment of exhaust gases from internal combustion engines employed in autos, trucks and other vehicles. In connection with the waste products, or exhaust gas streams, from automotive engines, there are various harmful noxious components which need treatments prior to discharge to the atmosphere. Such exhaust gases contain one or more components as unburned hydrocarbons, carbon monoxide, nitrogen oxides, sulfur compounds, partially oxidized products, etc., in various concentrations and part or all of these components are believed to contribute to the smog problem presently facing various geographical areas of the United States and other countries.

In order to overcome the problems of smog and of atmospheric contamination, it has been proposed to use afterburners or catalytic devices in the exhaust gas system of the vehicles. The use of catalytic devices or converters provides means for aiding and enhancing the oxidation of various of the incompletely oxidized components of the exhaust gas streams from motor vehicles and may generally be considered the preferable way of purifying exhaust gas streams. In the catalytic operation, the hot gases issuing from the motor exhaust manifold are mixed with a quantity of secondary or combustion air and the resulting mixture passed through a catalyst bed maintained within a conversion zone so as to effect a more or less complete oxidation of the carbon monoxide and unburned hydrocarbons present in the exhaust stream. The use of a catalytic method also provides the initiation of the oxidation reaction at lower temperatures than might otherwise be possible and effectively eliminates the need for igniting means which are generally used with most types of "afterburners" or other apparatus which depend strictly upon thermal conversion conditions.

In the combustion of automotive exhaust gases with the catalyst bed, there arises, however, a major difficulty in that there is poisoning of the catalyst by lead compounds present by reason of the inclusion of tetraethyl lead in the motor fuel. With a fresh catalyst bed, only a small portion of it is actually necessary to produce satisfactory combustion of the carbon monoxide and hydrocarbons in the exhaust gas; however, the present practice is to have the catalyst bed sized much larger than is initially necessary because as the lead poisoning occurs, the catalyst activity declines, and as a result larger and larger amounts of catalyst become necessary to effect a substantial degree of combustion. It has been generally determined that even with a fresh catalyst bed, only a minor portion of the lead present in the exhaust stream is sorbed by the inlet portion of the bed, with the remainder of the lead passing through to the downstream portions of the bed where further quantities of the lead are sorbed by the catalyst with a poisoning effect. Thus, the downstream portions of a catalyst bed are subjected unnecessarily to poisoning conditions even though they have not been usefully employed initially to aid in the combustion of hydrocarbons and carbon monoxide.

It is a principal object of the present invention to provide a catalytic converter design which obtains increased efficiency in the utilization of the catalyst content by exposing only a portion of the catalyst bed at any one time, thereby increasing the useful life of the catalyst at a high level of activity.

It is also an object of the present invention to provide a converter design having a movable catalyst retaining section whereby alternate portions of catalyst are successively exposed to the incoming exhaust gas stream.

It is a still further object to utilize blades or vanes in connection with a movable rotating catalyst bed whereby gas flow through the converter will effect the desired movement of the catalyst bed within the unit.

Various types of designs and arrangements may be provided to effect the exposure of only a portion of the catalyst bed at any one time and to obtain the improved longer high activity life for a given amount of catalyst. In one example, means may be provided to have the gas flow through a portion initially comprising only some fraction of the total quantity of catalyst by means of movable ports which initially effect only the exposure of such fractional portion of the catalyst bed and then subsequently effect the contacting of increased portions of the total bed. Presuming a circular cross-section for the total catalyst bed, then the initial exposure would, for example, pass through and cover a 90% arc thereof, then after a given period of use, the inlet and outlet ports would be arranged to widen the scope of coverage and provide flow over 180° of arc. Subsequently, the ports may be arranged to flow over 270° of arc and finally, the entire bed.

A preferred form of converter, however, provides an equivalent type of exposure by having a movable catalyst-retaining section which may be shifted with respect to inlet and outlet ports. In other words, a movable bed results in the desired exposure of only a portion of the catalyst bed to the gas flow at any one time and provides an advantageous type of design for an efficient converter.

Briefly, the present invention provides in a broad embodiment, a catalytic converter for waste gases, comprising in combination, a confined housing, a perforate catalyst retaining section rotatably supported within the central portion of said housing, a gas inlet section adjacent to and communicating with a portion of the catalyst section, a gas outlet section adjacent an opposing portion of the catalyst retaining section, a gas inlet port to the gas inlet section and a gas outlet port from the gas outlet section, and a plurality of vane means connective with said rotatable catalyst retaining section and positioned within the gas flow path through said housing whereby the catalyst section is caused to rotate by the gas flow.

Various means may, of course, be provided to utilize blades or vanes and the like within a converter to effect the continuous movement of the catalyst retaining section whereby only a portion of the bed is exposed to the gas stream at any one time. For example, radial angularly positioned blades or vanes on a circular rotatable section placed in the path of the waste gas stream will have the velocity pressure of the stream exerted against them and a resulting force vector and rotational effect on the catalyst retaining section so that successive portions of such section will be exposed to the gas stream being channeled through the unit. In another arrangement, a plurality of blades, vanes, cups, or the like, may be pivotally mounted in the waste gas flow path and suitable gearing or other linkage means provided to translate their motive power to the catalyst retaining section such that the latter is continuously moved to expose alternate portions of the catalyst bed to the exhaust gas stream. In still another arrangement, vanes or blades may be positioned internally within a rotatable section which is adapted to hold catalyst and an inlet port arranged to impinge against the catalyst section and its internally positioned blades in a manner to cause rotation of such catalyst retaining section, whereby successive or spaced portions of catalyst are in turn exposed to the waste gas stream.

Reference to the accompanying drawing and the following description thereof will serve to more clearly point out constructions and arrangements of an improved type of catalytic converter having means to expose only a portion of the catalyst to the exhaust gas stream at any one time.

FIGURE 1 of the drawing is a diagrammatic sectional elevational view of one form of catalytic converter having a movable catalyst retaining section and radial vanes or blades adapted to effect rotation of the catalyst section.

Figure 2:
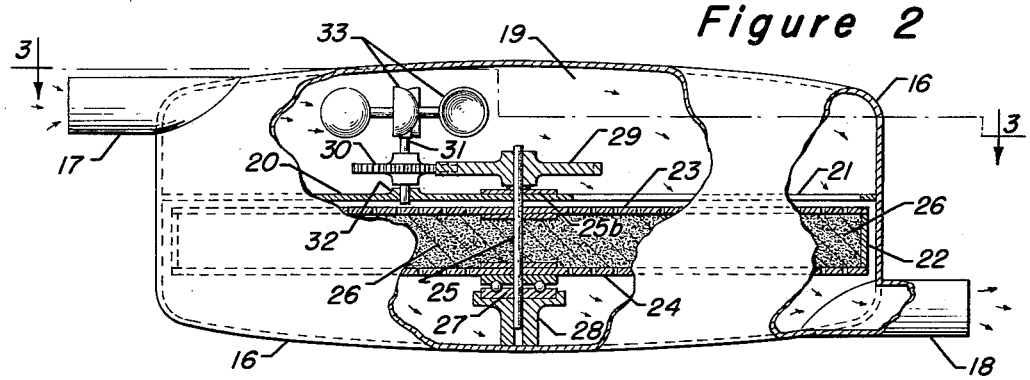
Figure 3:
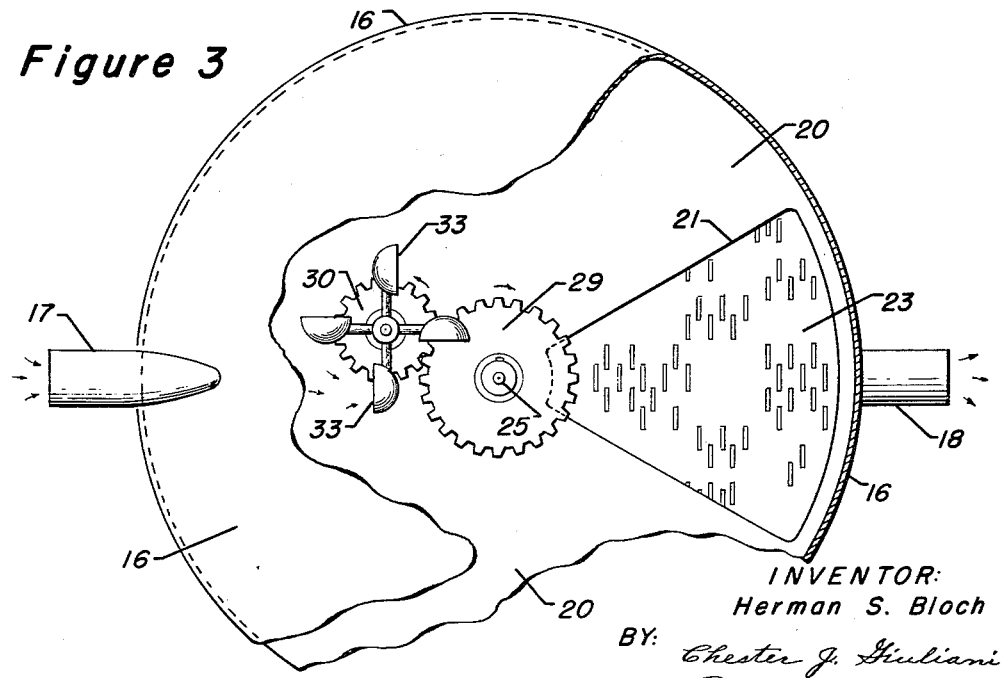

FIGURES 2 and 3 of the drawing indicate diagrammatically, in sectional elevational and sectional plan views, an embodiment of a catalytic converter having a movable catalyst retaining section and a small anemometer type of motor means utilized to effect rotation of the catalyst section.

Figure 4:
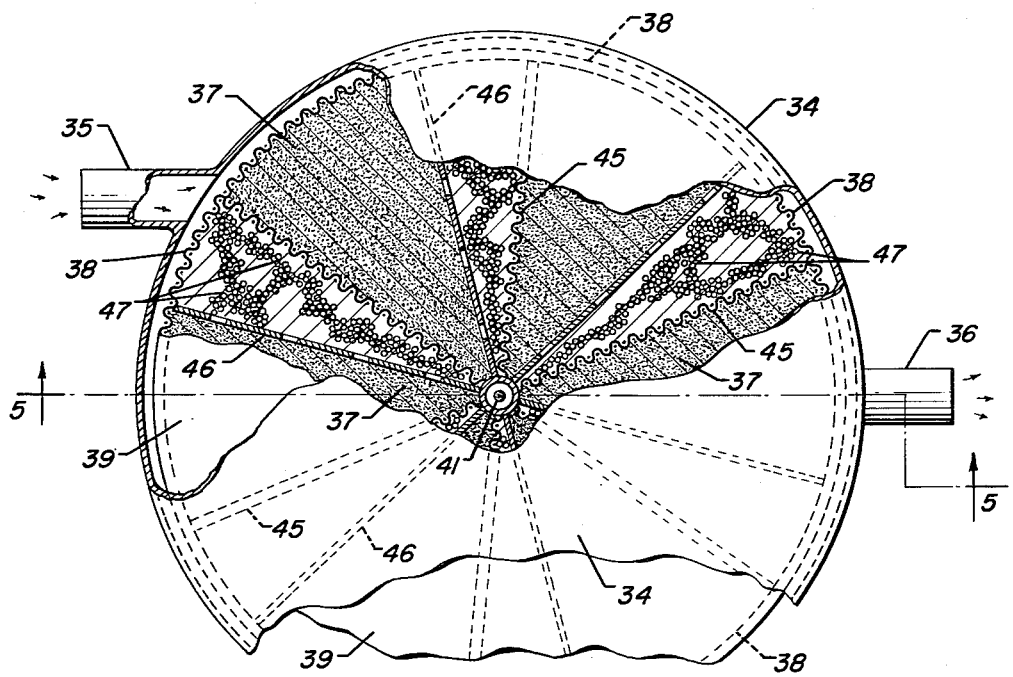
Figure 5:
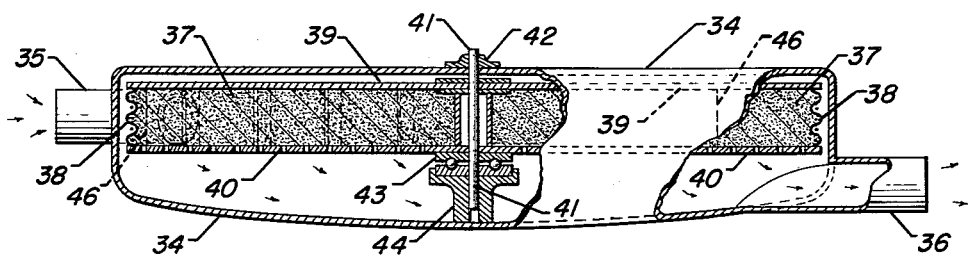

FIGURES 4 and 5 of the drawing show, in diagrammatic sectional plan and elevational views, still another form of catalytic converter which is designed to have radial vanes or blades positioned internally within the catalyst section whereby the incoming waste gas stream effects the rotation of the catalyst section and the resulting contacting of spaced portions of the catalyst bed.

Referring now to FIGURE 1 of the drawing, there is shown a relatively flat cylindrical-like housing 1 which is adapted to receive an exhaust gas stream by way of inlet port 2 and discharge a contacted stream by way of outlet port 3. The upper interior portion of the chamber 1 is formed into a gas inlet section 4 by means of a partition plate 5 that extends across the interior of the chamber 1. An open portion 6 in the plate 5 provides means for the flow of gases from the inlet port 2 through zone 4 and through the catalyst section to the outlet port 3. In the present embodiment, a catalyst bed 7 is retained in a shallow cylindrical form by means of a retaining section formed by a short non-perforate circular wall section 8, a perforate top cover plate 9 and a perforate bottom plate 10. The catalyst retaining section, in the resulting shallow cylindrical form, is connected to and mounted on a vertically positioned shaft member 11 such that it may rotate within the housing 1. The shaft 11 for the catalyst section rotates within an upper bearing 12 mounted on the partition plate 5 and within a lower bearing 13 which in turn is positioned below the lower plate 10 and supported by a suitable base or support post 14 from the bottom portion of the housing 1. Preferably, although not so indicated in the drawing, suitable roller or ball types of bearings are utilized at the ends of the shaft 11 whereby the catalyst retaining section is readily and easily rotated within the housing. A plurality of angularly positioned blades 15 extend radially along the bottom portion of the lower perforate plate 10 to the catalyst section. Such blades or vanes are at an angle with respect to the bottom plate 10 and are of such size and spacing as to give a desired horizontal increment of force, or vector, and resulting rotational movement to the catalyst retaining section and bed 7 as the exhaust gas stream passes through the upper inlet section 4, the opening 6, and through a sector or segmental portion of the catalyst bed 7. It is not necessary that the catalyst bed 7 be rotated at a high speed within the converter, but on the contary, it is desired that the rotation be rather slow and continuous in order to provide the desired effect of gradually exposing different portions of the catalyst bed to the opening 6 and to the incoming waste gas stream. The opening 6 may be a sector comprising a predetermined fraction or proportion of the cross-sectional area of the unit, such as 60° or 90° of the arc.

The perforations in plates 9 and 10, as well as the opening 6 in plate 5, shall be sized and spaced to minimize pressure drop through the catalyst bed 7 so that there is, in turn, a minimum back pressure through the exhaust gas system to the internal combustion engine. Perforations shall, of course, also be sized to preclude loss of catalyst particles from the unit.

In FIGURES 2 and 3 of the drawing, there is indicated a housing 16, which like the housing of FIGURE 1, may be provided in a form which is relatively shallow and cylindrical in order to accommodate a circular or cylindrically shaped unit as a catalyst retaining section. The housing 16 is provided with an inlet 17 and a gas outlet 18, with the inlet 17 connecting to and communicating with the gas inlet section 19 formed by a baffle or partitioning plate 20 extending laterally across the interior of housing 16. Plate 20 is in turn provided with a partially open area or sector 21 which serves to direct the exhaust gas stream flow through only a portion of the interior of housing 16 and through an adjacent portion of the catalyst bed 26. As provided in the embodiment of FIGURE 1, a catalyst retaining section is provided by means of a non-perforate circular or cylindrical wall 22, an upper perforate plate 23 and a lower perforate plate 24. The latter members are attached to a vertical shaft member 25 whereby the contained catalyst bed 26 may be continuously rotated within the housing 16. The upper portion of the shaft 25 rotates within a collar bearing 25B which is attached to plate 20, and the lower portion of shaft 25 rotates within a bearing 27 which in turn is supported by a base or post member 28 extending from the lower portion of housing 16.

The upper end of shaft 25 is provided with a relatively large diameter gear member 29 which engages with a smaller spur gear member 30. The latter gear is mounted on a short vertical shaft member 31 which projects upwardly from a suitable bearing member 32 being in turn supported on the partitioning plate 20. The upper end of the shaft 31 is provided with a plurality of radially extending cup members 33 which are positioned to be within the path of the inlet gas stream from port 17. In operation, it will be noted that the gas stream directed through the inlet port 17 will impinge upon cups 33 and effect the rotation of gear 30 which in turn will effect the counter-rotation of the larger gear 29 connecting to shaft 25 such that the catalyst bed 26 is rotated within the housing. Here again, the gradual rotation of bed 26 will effect the exposure of a varying portion of the catalyst bed to the exhaust stream which is continually passed through opening 21 to the lower portion of the housing for discharge through gas outlet 18. The size of the open sector 21 will determine the fractional portion of the catalyst bed which is exposed to the stream at any one time.

This particular embodiment, utilizing cups 33 which are of a design similar to those generally utilized in connection with anemometers, is, of course, not intended to be a limiting design, inasmuch as other types of vanes or turbine-like blades may well be used to provide the desired turbine effect and resulting motive power for rotation of the catalyst bed. Also, suitable chain or belt means may well be utilized in lieu of the gearing arrangement diagrammatically indicated in the present drawing.

Referring now to FIGURES 4 and 5 of the drawing, there is shown still another embodiment of a catalytic converter providing means for effecting rotational movement to a specially constructed form of shallow cylindrically shaped catalyst retaining section within a confined housing 34. The housing 34 is provided with an off center gas inlet port 35 and a radially positioned gas outlet port 36, with the off center inlet port being directly connected with the vertical side portion of the housing 34 and the outlet port 36 extending from a lower portion thereof. In the present embodiment, the catalyst bed is divided into segments 37 within the cylindrical retaining section which is formed by means of a perforated circular or cylindrical side wall member 38, a substantially solid or non-perforate top plate 39 and a perforate lower plate 40. The upper and lower plates, 39 and 40 respectively, connect with a shaft member 41 which is held by and rotates within an upper bearing 42 and a lower bearing 43 which in turn is supported from a base of support member 44 at the bottom of the housing 34.

As is best shown in FIGURE 4 of the drawing, the cylindrically shaped catalyst retaining section is divided into a plurality of segments by means of spaced perforate radial members 45 and spaced blade members 46 which also extend radially from the center zone. The peripheral wall 38 and the radial partitioning members 45 may be made of screen or mesh, or of a perforate plate with a high percentage open perforations whereby the gas stream easily passes therethrough with a minimum of pressure drop. On the other hand, the radial blade like members 46 are plate members which have a small amount of open area, with respect to members 45, such that they may act as vanes or blades in the gas stream flow path whereby they in turn will effect a rotation to the entire cylindrical catalyst retaining section. A downstream segmental portion 47 behind each partitioning member 46 may be packed with ceramic balls or other relatively large inert bodies such that there is a chance for the exhaust gas stream to be redistributed and dispersed downwardly into the lower portion of the housing 34 or further downstream into a next succeeding catalyst segment 37.

In the operation of this embodiment of the catalytic converter, it may be observed that the incoming gas stream from port 35 will pass through the side wall portion 38 and into the interior of the catalyst section 37 with a minimum of resistance but as the gas stream impinges against the less perforate member 46 there will result a gas stream impact causing rotation of the entire cylindrical section. The respective radial members 45 and 46 are, of course, spaced to form relatively small sectors or "pie-shaped" segments 37 and 47 such that the gas stream impact on members 46 will have a substantially continuous effect to provide in turn a substantially continuous rotation to the entire catalyst retaining section.

In each of the embodiments heretofore described, it is, of course, necessary to utilize suitable alloy metal screens or meshes and perforate alloy plate members for retaining the oxidation catalyst, inasmuch as high temperature conditions will obtain as the oxidation reaction is carried out. Depending upon the particular catalytic material employed, the temperatures may well run above 1200° F. and up to the order of 1800° F. The operation of the particular vehicle—that is, whether it is being operated under conditions of idle, acceleration, cruising, or deceleration—will provide variations in the internal temperature of the converter.

Although not shown in the drawing, suitable insulating material may be utilized around the converter housings to maintain temperature conditions within the converter as well as to protect surrounding equipment from the high temperature conditions within the gas converter. Various modifications may also be made with respect to the detailed construction of any of the converter embodiments within the scope of the present invention, inasmuch as it is not intended to limit the present invention to the diagrammatic details embodied in the accompanying drawing. For example, the gas flow may be channeled upwardly through the catalyst bed, rather than downwardly as presently described, and ball bearing or roller bearing means may be provided around the upper portion of the shaft for the rotating catalyst retaining section. Also, many types and forms of turbine blade means or vanes may be utilized in the designs to accomplish the desired motive power for the slow rotational movement of the catalyst bed such that only a portion of the catalyst is exposed to the flow path of the exhaust gas stream at any one time.

Further, it is not intended to limit the present invention to the use of any one type of catalytic material inasmuch as many types of suitable oxidation catalysts incorporating high temperature-resistant base materials and activating components may be brought into use in the present forms of the converters. For example, the catalyst activating component may comprise any of the following: platinum, in small quantities of from 0.1 to 0.5% by weight of the composite, or palladium, iridium, osmium, ruthenium and rhodium, or iron, cobalt, nickel, copper, vanadium, tungsten, molybdenum, or noble metals such as silver and gold utilized in small quantities sufficient to provide the desired activity. Various mixtures may also be utilized including, platinum-cobalt, platinum-iron, platinum-nickel, palladium-iron, palladium-cobalt, palladium-nickel, platinum-palladium, platinum-copper-cobalt, platinum-copper-lithium-cobalt, palladium-cobalt-copper, platinum-copper-cobalt-nickel, platinum-palladium-cobalt, platinum-magnesium, platinum-cobalt-magnesium, platinum-cobalt-lithium, etc. Such catalytically active components may be composited with a suitable refractory inorganic oxide carrier material such as aluminum oxide spheres, or an oxide of one or more of the following: silicon, zirconium, titanium and hafnium, or alternatively, such metal oxides compounded with alumina as the principal base material. Also, varying types and shapes of catalyst particles may be utilized in packing the various catalyst retaining sections, with the catalytic material being in the form of spheres, or of pellets of various extruded shapes. In any case, the screens or perforate members shall be provided with perforations which are adapted to correlate with the particle size of the catalytic material being supplied to any one embodiment such that catalyst particles are not lost from the retaining sections.

I claim as my invention:

1. A catalytic converter for waste gases, comprising in combination, a confined housing, a perforate catalyst retaining section rotatably supported within the central portion of said housing, a gas inlet section adjacent to and connecting directly with only a fractional portion of said catalyst section, a gas outlet section adjacent to and communicating with another portion of said catalyst retaining section, a gas inlet port to said gas inlet section and a gas outlet port from said gas outlet section, and a plurality of vane means connective with said rotatable catalyst retaining section and positioned within the gas flow path through said housing whereby said catalyst section is caused to rotate by the gas flow.

2. The converter of claim 1 further characterized in that said catalyst retaining section is cylindrically shaped and supported from a vertically positioned center shaft.

3. A catalytic converter for waste gases comprising in combination, a confined shallow cylindrically shaped housing, a perforate circular catalyst retaining section rotatably supported within the central portion of said housing, partitioning means between one face of said catalyst section and the top of said housing forming a gas inlet section adjacent to said catalyst retaining section, an open portion in said partitioning means providing gas flow to only a fractional portion of said catalyst retaining section, a gas outlet section adjacent to an opposing portion of said catalyst retaining section, a gas inlet port to said gas inlet section and a gas outlet port from said gas outlet section, a plurality of radially extending vanes connecting with the lower portion of said catalyst retaining section and extending at an angle with respect to the face thereof whereby gas flow through said housing and said catalyst retaining section will effect an impact against such angularly positioned vanes and a resulting rotational effect to the catalyst retaining section.

4. The converter of claim 3 further characterized in that said circular catalyst retaining section is rotatably mounted on a vertical shaft held within the central portion of said confined housing and said partitioning means has a sector shaped open portion restricting gas flow to an opposing sector of said catalyst retaining section whereby the gas stream passes directly through only a fractional portion of said circular catalyst retaining section at any one time.

5. A catalytic converter for waste gases comprising in combination, a confined cylindrically shaped housing, a perforate circular catalyst retaining section rotatably supported on a vertically positioned center shaft within the central portion of said housing, said shaft being supported from the lower portion of said housing in a manner permitting said catalyst retaining section to rotate horizontally within said housing, partitioning means across the interior of said housing, said partitioning means forming a gas inlet section adjacent to and connecting with said catalyst retaining section and having a sector shaped partial opening effective to direct gas flow to a portion only of said perforate rotatable catalyst retaining section, a gas outlet section adjacent the lower portion of said catalyst retaining section, a gas inlet port to said gas inlet section and a gas outlet port from said gas outlet section, a plurality of vane-like means connecting with and extending from a shaft rotatably supported within said gas inlet section and in a position opposing said gas inlet port and linkage means between last said shaft and said shaft supporting said catalyst retaining section whereby the rotation of said vane-like means by said gas stream effects the rotation of said catalyst retaining section.

6. The converter of claim 5 further characterized in that said vane-like means extend radially from a short vertical shaft mounted within said gas inlet section and are positioned in the flow path from said gas inlet port, and said linkage means comprises gearing means connecting said short shaft with the shaft supporting said catalyst retaining section.

7. A catalytic converter for waste gases comprising in combination, a confined shallow cylindrically shaped housing, a cylindrically shaped catalyst retaining section rotatably mounted on a vertically positioned shaft within the central portion of said housing, said catalyst retaining section having a perforate cylindrical side wall portion, a perforate bottom portion and a non-perforate top closure, a plurality of spaced radially positioned perforate members within said catalyst retaining section, a corresponding plural member of radially extending vane members spaced from and alternately with said perforate radial members and providing thereby a plurality of spaced sectors, with alternate sectors providing respectively, catalyst retaining sectors and gas stream redistribution sectors, said radial vane members being substantially solid and of a lesser percentage of perforation than first said radial members, a gas inlet port connecting with the side of said confined housing in a manner opposing the side wall portion of said cylindrically shaped catalyst retaining section, and a gas outlet port from said confined housing below the level of said cylindrically shaped catalyst retaining section, whereby gas flow entering said housing passes through only a portion of said cylindrically shaped catalyst retaining section at any one time and is discharged from the lower portion thereof and from said housing through said gas outlet port.

8. The converter of claim 7 further characterized in that the perforate cylindrical side wall portion of said catalyst retaining section is formed with a high percentage of openings to provide a minimum of back pressure against the incoming gas stream through said inlet port, and said inlet port connects with said housing at a non-radial direction.

9. The converter of claim 8 still further characterized in that the redistribution sectors within said catalyst retaining section are filled with relatively large sphere-like members in a manner suitable for effecting redistribution of that portion of a gas stream which passes beyond said vane members.

References Cited in the file of this patent
UNITED STATES PATENTS

| | | |
|---|---|---|
| 813,367 | Dutcher | Feb. 20, 1906 |
| 2,337,956 | Yerrick et al. | Dec. 28, 1943 |
| 2,853,367 | Karol et al. | Sept. 23, 1958 |